US007107267B2

(12) United States Patent
Taylor

(10) Patent No.: US 7,107,267 B2
(45) Date of Patent: Sep. 12, 2006

(54) METHOD, SYSTEM, PROGRAM, AND DATA STRUCTURE FOR IMPLEMENTING A LOCKING MECHANISM FOR A SHARED RESOURCE

(75) Inventor: Julian S. Taylor, Nederland, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 1002 days.

(21) Appl. No.: 10/066,362

(22) Filed: Jan. 31, 2002

(65) Prior Publication Data

US 2003/0145210 A1 Jul. 31, 2003

(51) Int. Cl.
*G06F 7/00* (2006.01)
*G06F 17/30* (2006.01)
(52) U.S. Cl. .......................................... 707/8; 713/182
(58) Field of Classification Search ................ 709/229, 709/100; 395/726; 707/8, 10, 202; 713/182
See application file for complete search history.

(56) References Cited

U.S. PATENT DOCUMENTS

| | | | | |
|---|---|---|---|---|
| 5,669,002 A | * | 9/1997 | Buch | 710/200 |
| 6,145,006 A | * | 11/2000 | Vishlitsky et al. | 709/229 |
| 6,622,155 B1 | * | 9/2003 | Haddon et al. | 718/100 |

OTHER PUBLICATIONS

Krieger et al., "A Fair, Fast Scalable Reader-Writer Lock", Proceedings of the International Conference on Parallel Procesing, 1993.*

Judd et al., "Design issues for efficient implementation of MPI in Java", Proceedings of the ACM 1999 conference on Java Grande, San Francisco, California, United States; pp. 58-65; Year of Publication: 1999.*
Schwan et al., "Improving Performance by Use of Adaptive Objects: Experimentation with a Configurable Multiprocessor Thread Package", Proceedings the 2nd International Symposium on High Performance Distributed Computing, 1993., Jul. 20-23, 1993; pp. 59-66.*
Bryant et al., "Lockmeter: Highly-Informative Instrumentation for Spin Locks in the Linux Kernel", Proceedings of the 4th Annual Linux Showcase & Conference, Atlanta; Oct. 2000; USENIX.*
DS, "class readwritelock : public abstractsemaphore", Authored: Nov. 1998 Accessed at: http://www.ligo-wa.caltech.edu/gds/dtt/dtt/readwritelock.html; Nov. 28, 2005.*
Taterinov et al., "A semi-Optimistic Database Scheduler Based on Commit Ordering", NDSU Tech Report, 1997.*

(Continued)

*Primary Examiner*—Jeffrey Gaffin
*Assistant Examiner*—Michael J Hicks
(74) *Attorney, Agent, or Firm*—Lahive & Cockfield LLP

(57) ABSTRACT

Provided are a method, system, program, and data structure for implementing a locking mechanism to control access to a shared resource. A request is received to access the shared resource. A determination is made of whether a first file has a first name. The first file is renamed to a second name if the first file has the first name. A second file is updated to indicate the received request in a queue of requests to the shared resource if the first file is renamed to the second name. An ordering of the requests in the queue is used to determine whether access to the shared resource is granted to the request. The first file is renamed to the first name after the second file is updated.

63 Claims, 11 Drawing Sheets

OTHER PUBLICATIONS

Lamport, L. "The Mutual Exclusion Problem: Part I-A Theory of Interprocess Communication". *Journal of the Association for Computing Machinery*, vol. 33, No. 2, Apr. 1986, pp. 313-326.

Ford, D. "Mututal Exclusion and Synchronization: Mimicking Win32 synchronization mechanisms". [online] *Dr. Dobb's Journal*, Jan. 1998, [Retrieved on Oct. 17, 2001]. Retrieved from the Internet at <URL: http://www.ddj.com/articles/1998/9801/9801g/9801g.htm>.

Lamport, L. "The Mutual Exclusion Problem: Part I-A Theory of Interprocess Communication". *Journal of the Association for Computing Machinery*, vol. 33, No. 2, Apr. 1986, pp. 327-348.

Herlihy, M. and J.E.B Moss. "Transactional Memory: Architectural Support for Lock-Free Data Structures". Copyright Digital Equipment Corporation and J.E.B. Moss, Dec. 1, 1992. pp. 1-40.

Kramer, D. "The Java Platform", Copyright Sun Microsystems, Inc., May 1996. pp. 1-24.

* cited by examiner

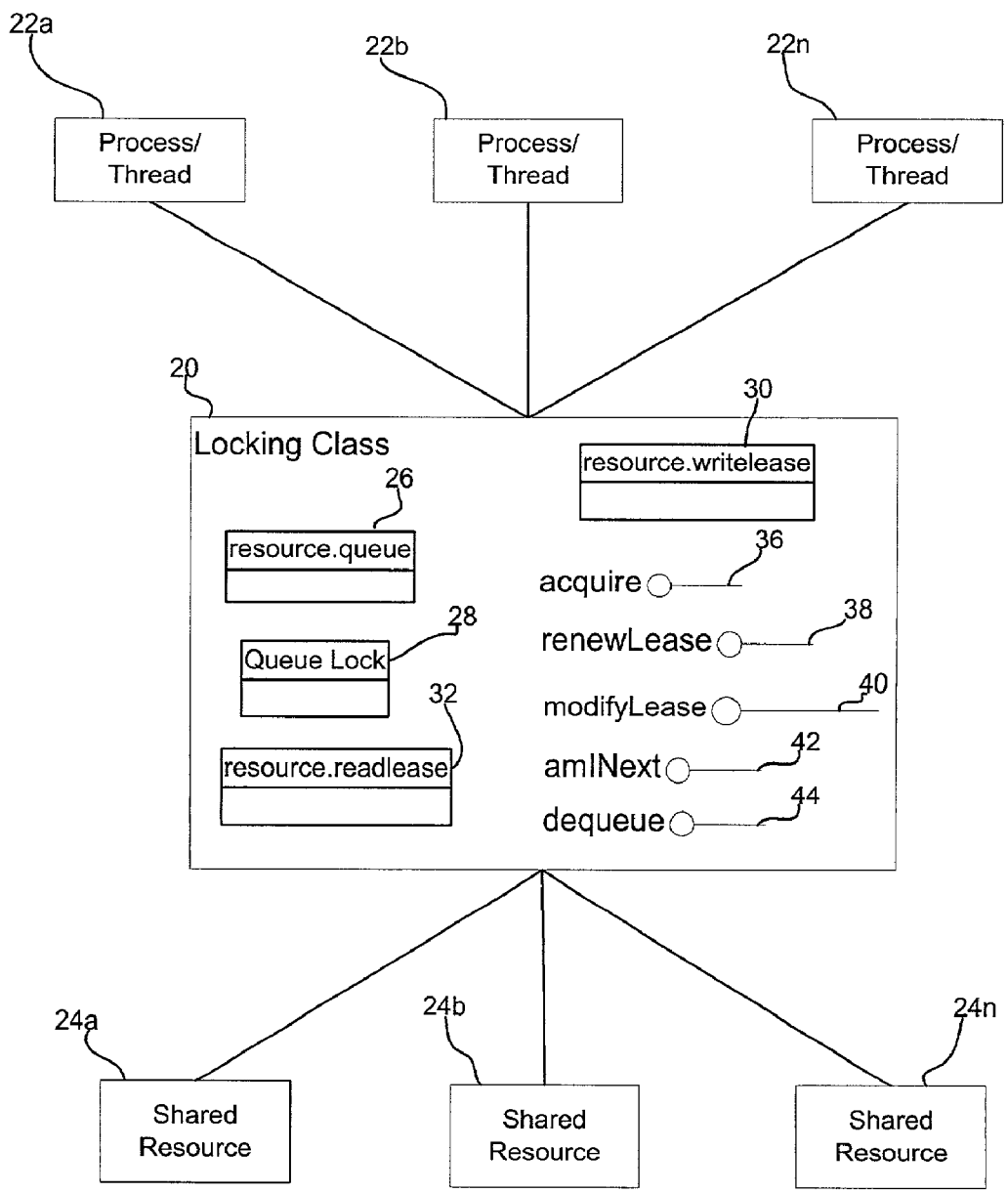

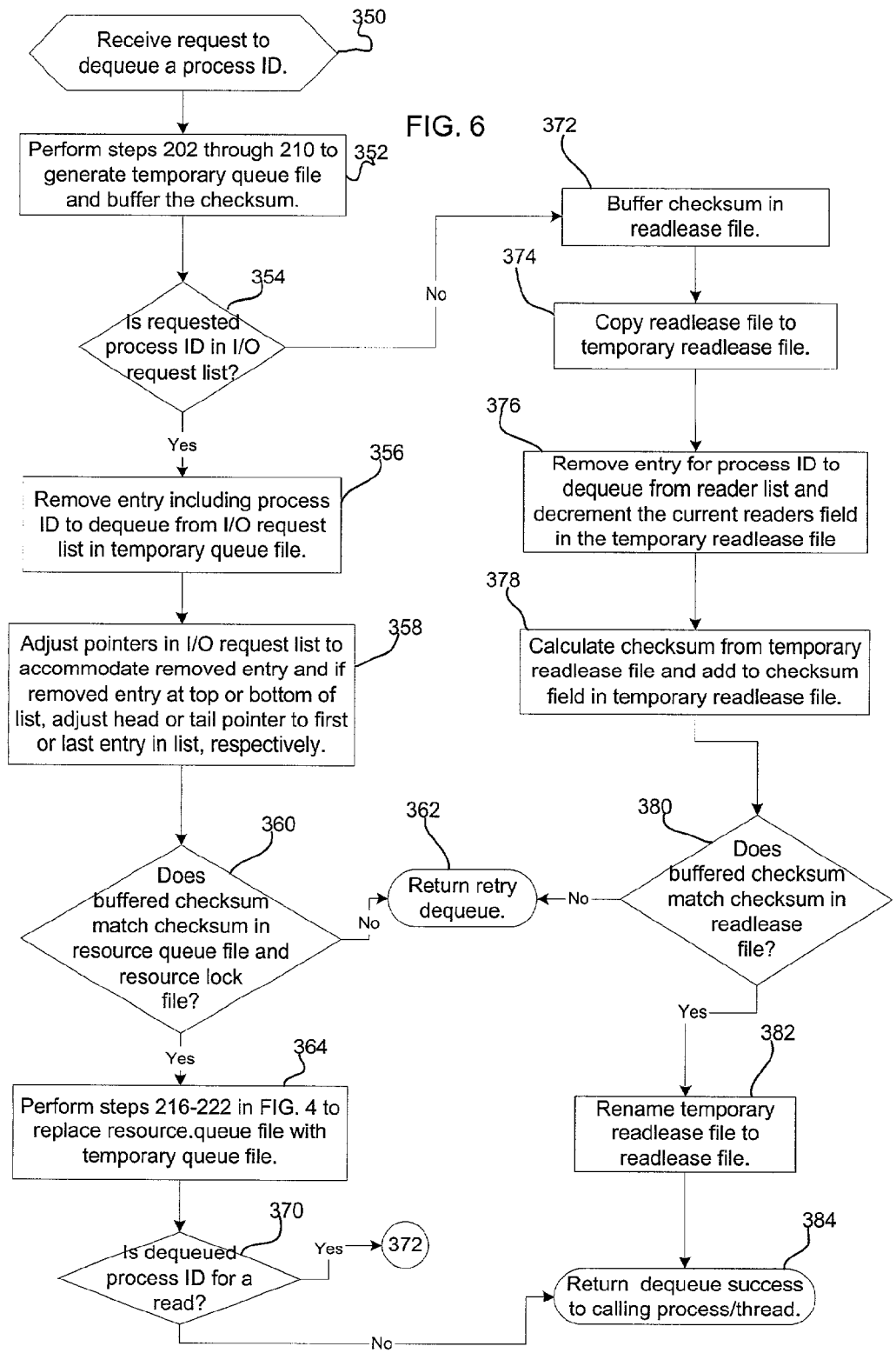

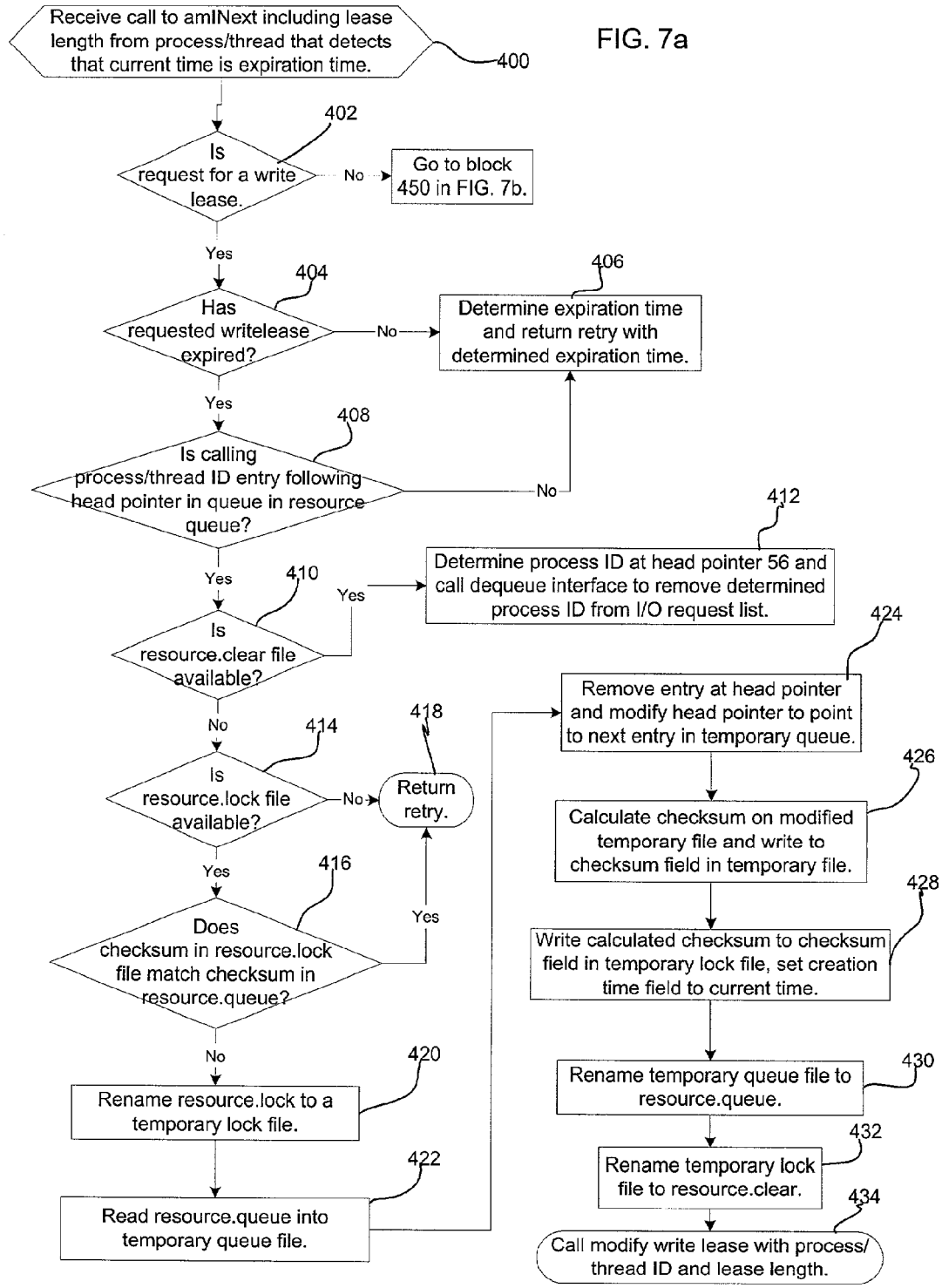

METHOD, SYSTEM, PROGRAM, AND DATA STRUCTURE FOR IMPLEMENTING A LOCKING MECHANISM FOR A SHARED RESOURCE

BACKGROUND OF THE INVENTION

1. Field of the Invention

The present invention relates to a method, system, and program for implementing a locking mechanism for a shared resource.

2. Description of the Related Art

Almost all computer architectures provide a locking mechanism to control the execution of concurrent operations directed to a shared resource in a manner that ensures that no two processes execute their critical sections concurrently. This means that two processes cannot be allowed to simultaneously proceed with mutually exclusive atomic operations. In prior art systems, a process, such as a write operation, that requires exclusive access to a shared resource must obtain an exclusive lock on the shared resource that prevents any other process from concurrently accessing the resource. A process requiring non-exclusive access, such as a read operation, must obtain a nonexclusive lock to access the resource. Multiple resources with a non-exclusive lock may concurrently access the resource associated with the lock.

Computer operating systems implement some form of a locking mechanism to control how processes are allowed access to resources. Application programs also implement a locking mechanism to control access to shared application resources, such as database tables, files, etc. For instance, database programs institute locking to prevent two different requests from performing mutually exclusive operations with respect to database records.

Notwithstanding the widespread use of locking, software developers writing programs in computer languages intended to execute across multiple operating systems through the use of a virtual machine layer, such as the Java programming language, have faced difficulties implementing locking mechanisms. One prior art solution is to write separate native locking mechanisms for each operating system on which the cross-platform application will execute. When the application requires locking, the application would call the native locking mechanisms written for the specific operating system. This approach is especially cumbersome because the software developer must write separate native locking mechanisms for each operating system on which the application is designed to run. For this reason, many Java applications do not implement a locking mechanism.

Moreover, even if a locking mechanism is implemented in Java that utilizes the native operating system locking mechanisms, in cases where the Java application partially fails, the lock may remain in place in the operating system tables even though the Java process is no longer functional. Such a result of a partial crash can be quite common in applications that use a virtual machine or extra translation level, such as the Java Virtual Machine, between the executing application and operating system.

For these reasons, there is a need in the art to provide a technique for implementing a locking mechanism for applications implemented in computer languages that are intended to execute across multiple operating system platforms.

SUMMARY OF THE DESCRIBED IMPLEMENTATIONS

Provided are a method, system, program, and data structure for implementing a locking mechanism to control access to a shared resource. A request is received to access the shared resource. A determination is made of whether a first file has a first name. The first file is renamed to a second name if the first file has the first name. A second file is updated to indicate the received request in a queue of requests to the shared resource if the first file is renamed to the second name. An ordering of the requests in the queue is used to determine whether access to the shared resource is granted to the request. The first file is renamed to the first name after the second file is updated.

In further implementations, a lease data structure indicates at least one request in the queue in the second file granted access to the shared resource and, for each request granted access to the shared resource, a lease time during which the request is granted access to the shared resource. A determination is made of whether one request in the queue is permitted access to the shared resource based on the ordering of the request entries in the queue. The lease data structure is updated to indicate the determined request and the lease time if the determined request is permitted access to the shared resource. A message is returned to the request indicating that access to the shared resource is granted and the lease time during which access is granted.

In still further implementations, the request to access is for exclusive access to the shared resource. In such case, determining whether one request in the queue is permitted access to the shared resource further comprises determining the request following the request at a top of the queue after determining that the lease time has expired. The request at the top of the queue is removed and the queue is updated to indicate the determined request entry at the top of the queue. The lease data structure is further updated to indicate the determined request and set a new lease time for the determined request in the lease data structure during which the request has exclusive access to the shared resource.

In yet further implementations, the request to access is for non-exclusive access to the shared resource and the lease data structure indicates a number of requests allowed simultaneous access to the shared resource. In such case, determining whether one considered request in the queue is permitted access to the shared resource further comprises determining whether a number of current readers is less than the allowed readers and determining whether less than the number of current readers precedes the considered request in the queue. The lease data structure is updated to indicate the considered request and set a new lease time for the considered request to have nonexclusive access to the shared resource if the number of current readers is less than the allowed readers and less than the number of current readers precedes the considered request in the queue. The number of current readers is incremented after updating the lease data structure to identify the considered request.

Still further, the locking mechanism may be executed on multiple operating system platforms, and the steps of renaming and updating correspond to native operating system commands implemented across operating system platforms. For instance, the locking mechanism may be implemented in a cross-platform computer programming language, such as the Java programming language, that is called by applications seeking to access the shared resource.

The described implementations provide techniques for implementing a locking mechanism using basic file system commands, such as a renaming command to communicate whether a resource associated with a file is locked. Such implementations are useful in cross-platform computer languages because most operating systems implement basic file system commands such as the rename command, thereby allowing the locking mechanisms to be implemented in the same manner across operating systems.

BRIEF DESCRIPTION OF THE DRAWINGS

Referring now to the drawings in which like reference numbers represent corresponding parts throughout:

FIG. 2 illustrates a program component architecture in accordance with implementations of the invention;

FIGS. 4, 5a, 5b, 6, 7a, 7b, 8, and 9 illustrate program logic of the locking mechanism in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1A:
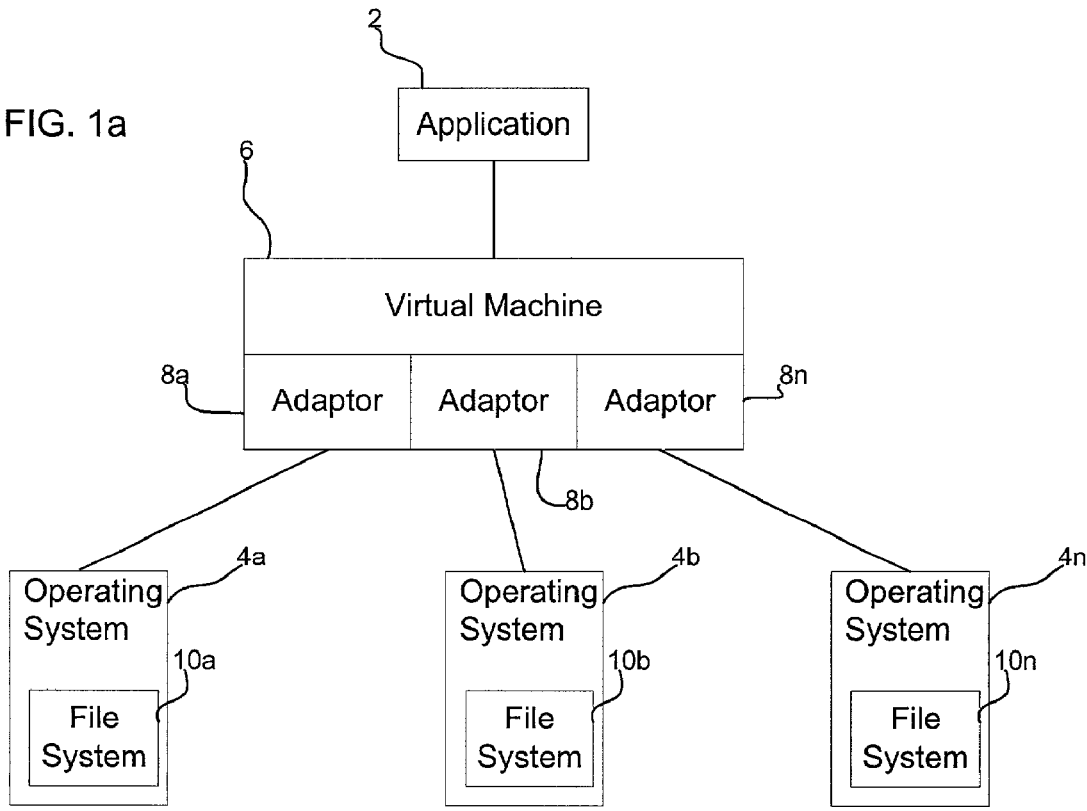
FIGS. 1a and 1b illustrate computing environments in which aspects of the invention are implemented.

FIG. 1a illustrates a computing environment in which aspects of the invention are implemented. An application 2 is written in a cross-platform computer language, such as the Java programming language, that is intended to execute on multiple operating systems 4a, 4b . . . 4n. A virtual machine 6, such as the Java Virtual Machine (JVM), converts the application statements to basic instructions, which in the case of the Java language comprises Java bytecodes. The virtual machine 6 includes an adaptor component 8a, 8b . . . 8n for each operating system 4a, 4b . . . 4n on which the cross-platform language executes. The adaptor components 8a, 8b . . . 8n transform the Java bytecodes to native operating system instructions that are then executed directly by the operating system 4a, 4b . . . 4n. Each operating system 4a, 4b . . . 4n includes a file system 10a, 10b . . . 10n, which implements common file system management techniques known in the art. For instance, each file system 10a, 10b . . . 10n would include such file management operations as delete, create, rename, copy, read, write, etc.

Figure 1B:
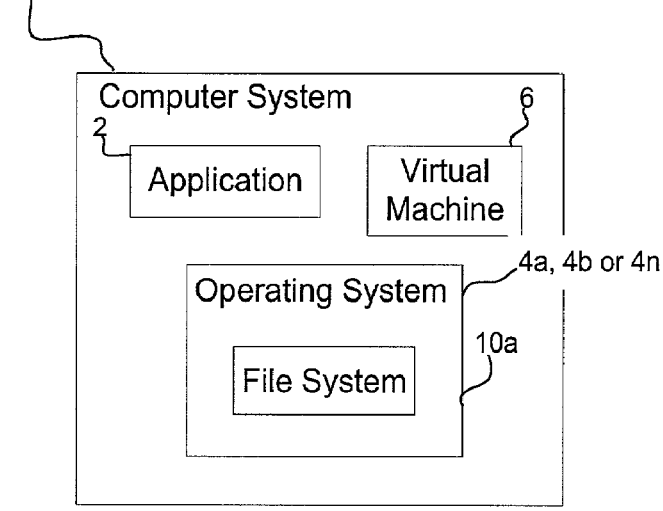

FIG. 1b illustrates one implementation where the application 2, virtual machine 6, and operating system 4a, 4b . . . 4n would execute on a computer system 12, which may comprise any computing device known in the art, such as a workstation, desktop computer, laptop computer, mainframe, hand held computer, Personal Digital Assistant (PDA), telephony device, Internet appliance, etc. Alternatively, in a distributed computing environment, the application 2, virtual machine 6, and operating system 4a, 4b . . . 4n/file system 10a, 10b . . . 10n on which the locking mechanism operations are performed may be executing on different computer devices.

In the described implementations, the locking mechanism is implemented in methods and objects of a locking class. FIG. 2 illustrates an architecture of the locking class 20 that is called by multiple processes/threads 22a, 22b . . . 22n executing in the operating system 4a, 4b . . . 4n to access shared resources 24a, 24b . . . 24n. The shared resource 24a, 24b . . . 24n may comprise hardware, code, data, files, a database, table in a database, records in a database, etc. The locking class 20 instantiates a resource.queue 26, queue lock 28, resource.writelease 30, and resource.readlease 32 objects for each shared resource 24a, 24b . . . 24n that is accessed through the locking mechanism. The locking class 20 provides an acquire 36, renewLease 38, modifyLease 40, amINext 42, and dequeue 44 interfaces that the processes/threads 22a, 22b . . . 22n would call to utilize instances of the objects 26, 28, 30, and 32 in order to synchronize access to the shared resources 24a, 24b . . . 24nb . . . 4n.

Figure 3:
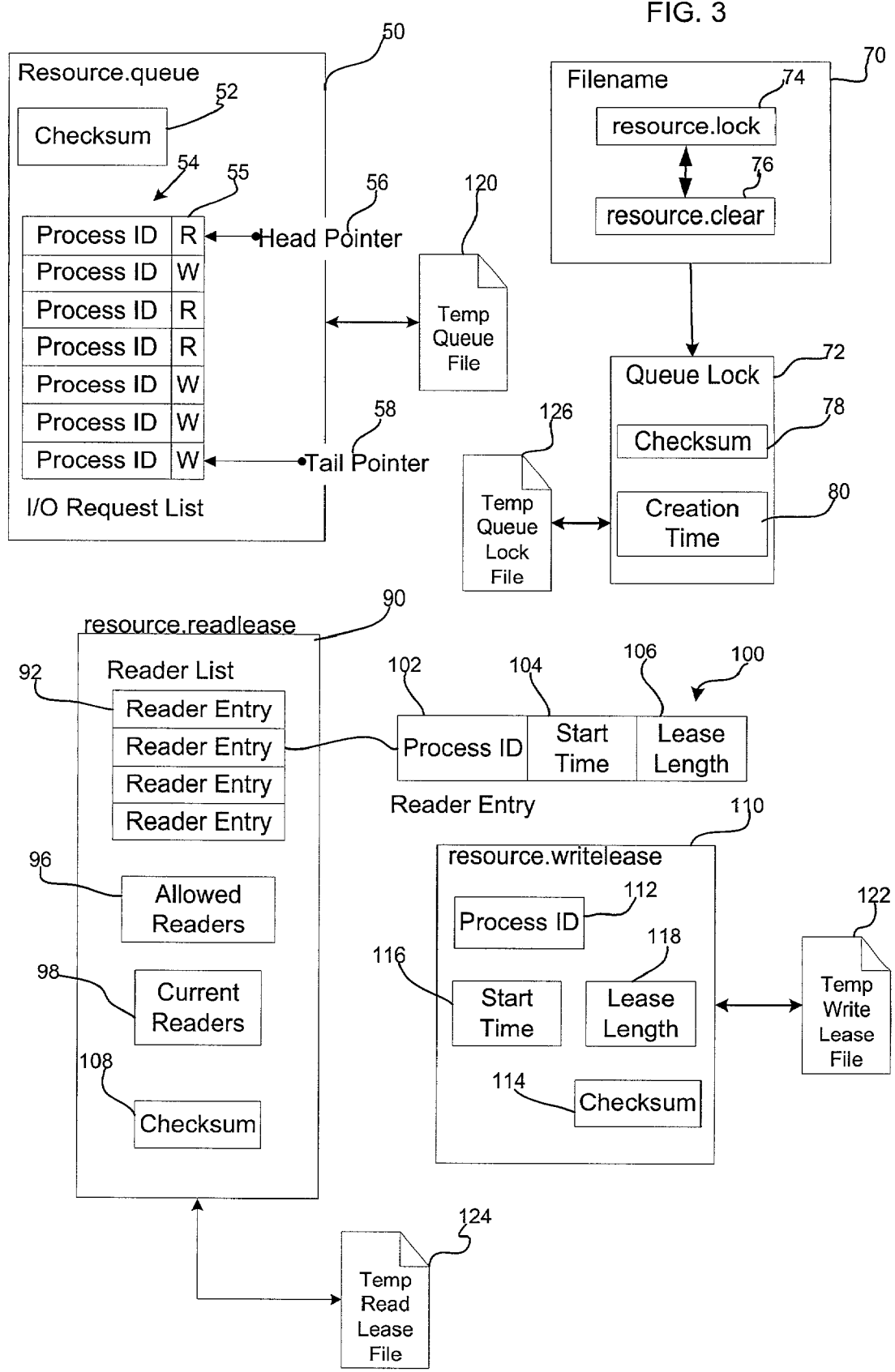
FIG. 3 illustrates data structures used to implement a locking mechanism in accordance with implementations of the invention.

In described implementations, the object instances 26, 28, 30, and 32 are implemented as files that are manipulated through basic file system 10a, 10b . . . 10n operations to coordinate synchronization to the shared resources 24a, 24b . . . 24n. FIG. 3 illustrates an implementation where instances of the objects 26, 28, 30, and 32 are implemented as files 50, 70, 90, and 110, respectively, using standard file system 10a, 10b . . . 10n operations commonly found in most widely used operating systems 4a, 4b . . . 4n. In the described implementations, the process/thread 22a, 22b . . . 22n that seeks the lock may itself execute the logic of the locking class interfaces 36, 38, 40, 42, and 44. Alternatively, the process/thread 22a, 22b . . . 22n seeking the lock may make a call to the locking class 20 interfaces 36, 38, 40, and 42, which, in turn, spawns a new thread or process to execute the interfaces 36, 38, 40, 42, and 44 and perform the synchronization related operations.

With respect to FIG. 3, a resource.queue file 50 provides a checksum field 52 calculated from all of the data in the resource.queue 50 file, and an I/O request list 54 comprising a linked list of I/O requests, where each entry provides a process identifier (ID) of the process or thread queued to perform a read or write operation with respect to the shared resource 24a, 24b . . . 24n. The I/O request list 54 has a head pointer 56 pointing to a top of the list 54, a tail pointer 58 pointing to the other end of the list 54, and pointers (not shown) between each entry in the list providing linkage. Entries are added to the list 54 at the head pointer 56.

In described implementations, the I/O requests are submitted by processes and threads. The process IDs shown in the I/O request list 54 comprises a unique identifier of the process or thread initiating the request. The I/O request list 54 further includes a column 55 providing a flag indicating whether the I/O request initiated by the process ID is for a read or write operation. A thread is an independent flow of control that operates within the same address space as other independent flows of controls. Multiple threads may be grouped into a single entity called a process. In a multiprocessor system, multiple threads can execute at the same time, one on each processor. There may be multiple processes executing, each including multiple threads. A process provides a common address space and common system resources, including file descriptors, signal actions, shared libraries, and inter-process communication tools (such as message queues, pipes, semaphores, or shared memory). The execution of the processes and threads are managed by the operating system 4a, 4b . . . 4n.

In described implementations, a queue lock file 72, having a filename 70, provides a communication variable to indicate whether a lock is maintained on the resource.queue file 50. The queue lock filename 70 communicates that a lock to the resource.queue file 50 is held if the filename 70 of the queue lock file 72 is resource.lock 74 and that no lock is held if the filename 70 of the queue lock file 72 is resource.clear

76. If a predetermined directory location does not include the file resource.clear 76 or includes resource.lock 74, then another process has access to the lock, otherwise, if the predetermined directory includes the file resource.clear 76 or does not include resource.lock 74, then no other process has an exclusive lock on the shared resource. To obtain an exclusive lock to write to the resource.queue file 50, the filename 70 of the queue lock file 72 would have to be renamed resource.clear 76 and the process wanting to obtain the lock to the resource.queue file 50 would rename the filename 70 of the queue lock file 72 to resource.lock 74. Likewise, to release the exclusive lock to allow other processes/threads access to the resource.queue file 50, the process/thread holding the lock would rename the filename 70 from resource.lock 74 to resource.clear 76. The queue lock file 72 further includes a checksum 78 calculated from the content of the resource.queue file 50 and a creation time 80 indicating when the queue lock file 72 was last modified.

With the described implementation, the communication variable to communicate whether a lock exists is the rename process, which is implemented in most file systems. In this way, the Java locking mechanism does not need to use operating system specific operations to implement the locking because the Java locking mechanism uses generic file system commands, such as rename, which are atomic operations implemented in the same manner across operating systems.

When obtaining read access to the shared resource, the process/thread 22a, 22b ... 22n granted read access would update a resource.readlease file 90 including a reader list 92 providing information on all processes/threads granted read access to the shared resource. An allowed readers field 96 indicates a maximum number of processes/threads that can be simultaneously granted read access to the shared resource 24a, 24b ... 24n. A current readers 98 field indicates the number of processes/threads that currently are granted read access to the shared resource 24a, 24b ... 24n. The reader list 92 includes zero or more reader entries, where each reader entry 100 indicates the process ID 102 of the process/thread granted read access to the shared resource, a start time 104 indicating the time the process/thread was granted access to the shared resource, and a lease length 106 indicating the length of time the process/thread is granted read access. A process/thread granted read access would cease read access operations when the lease expires, which is at a time comprising the start time 104 plus the lease length 106. The resource.readlease file 90 further includes a checksum 108 calculated from the contents of the resource.readlease file 90.

When obtaining write access to a shared resource, the process/thread granted the write access would update a resource.writelease file 110 including a process ID 112 of the process/thread granted write access and a checksum 114 calculated from the contents of the resource.writelease file 110. The start time 116 indicates the time the lease started, which may comprise the time the resource.writelease file 110 was last modified, and a lease length 118 indicating the time length of the lease. A separate instance of the data structures shown in FIG. 2 would be provided for each shared resource whose access is governed by the described implementations.

Figure 4:
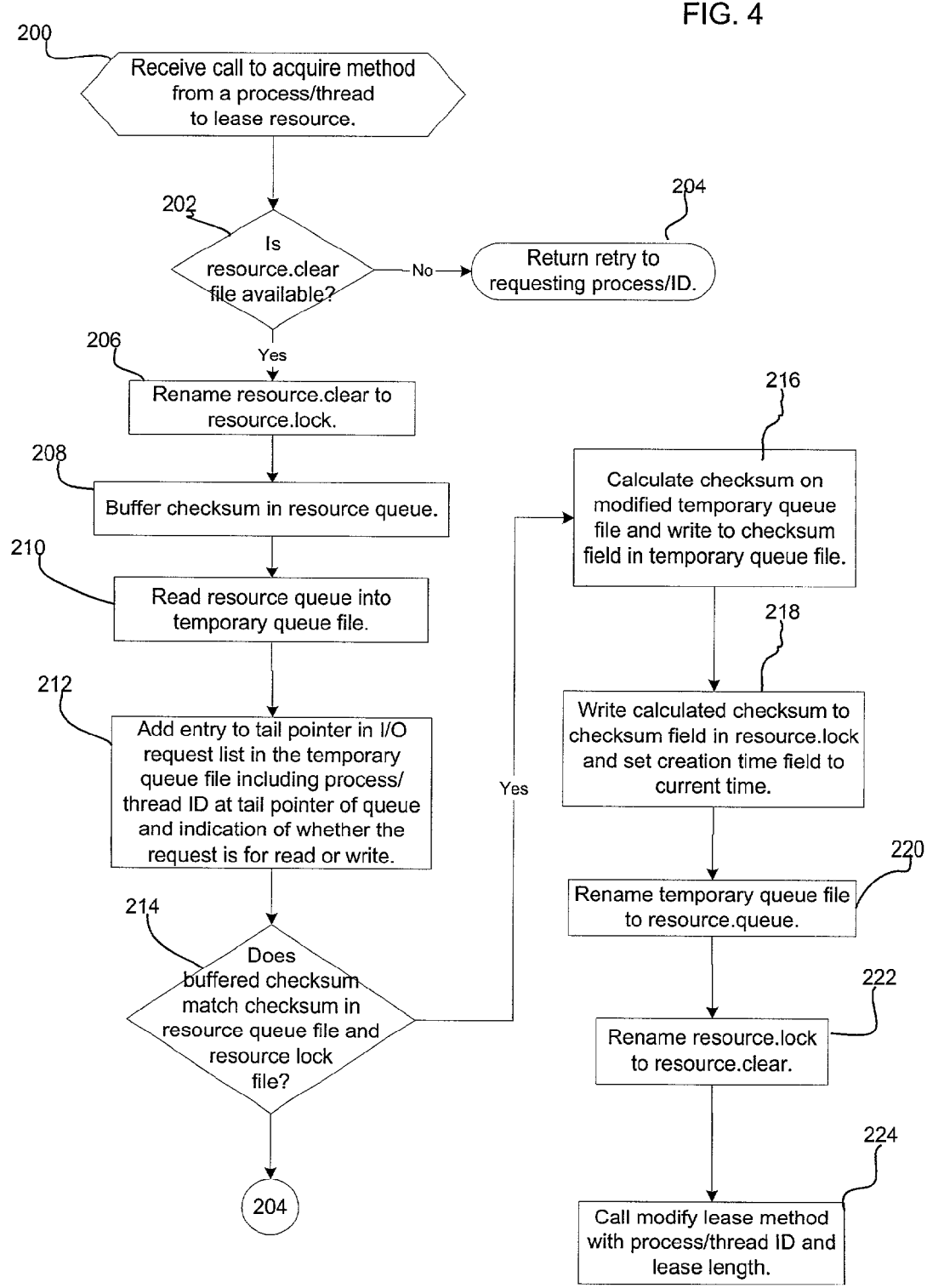

FIGS. 4, 5a, 5b, 6, 7a, and 7b illustrate the logic implemented in the interfaces 36, 38, 40, 42, and 44 to synchronize access to the shared resources 24a, 24b ... 24n. The virtual machine 6 would translate the logic of FIGS. 4, 5a, 5b, 6, 7a, and 7b into native operating system 4a, 4b ... 4n commands for execution. FIG. 4 illustrates the logic implemented in the acquire interface 36 that is called (at block 200) by a process/thread 22a, 22b ... 22n to lease a shared resource 24a, 24b ... 24n for a read or write operation for a period of time defined as a lease length. If (at block 202) the queue lock 72 is not named resource.clear 76, then the resource.queue file 50 is currently unavailable, i.e., another process has write access, and a retry message is returned (at block 204) to the calling process/thread to cause the calling process/thread to retry the request later. Otherwise, if (at block 202) the queue lock 72 is named (at block 204) resource.clear 74, then the queue lock 72 is renamed (at block 206) resource.lock 74 to communicate that the calling process/thread 22a, 22b ... 22n has exclusive access to the resource.queue file 50. The calling process/thread 22a, 22b ... 22n buffers (at block 208) the checksum value 52 and reads (at block 210) the resource.queue file 50 into a temporary queue file 120. The calling process/thread 22a, 22b ... 22n then adds (at block 212) a new entry at the tail pointer 58 of the I/O request list 54 in the temporary queue file including the process identifier (ID) of the calling process/thread 22a, 22b ... 22n and sets the I/O flag 55 to indicate whether the request is for a read or write.

If (at block 214) the buffered checksum of the resource-.queue file 50 does not match checksums 52 and 78 in the resource.queue file 50 and queue lock 72, currently named resource.lock, then an intervening process/thread 22a, 22b ... 22n has somehow managed to obtain the exclusive lock on the resource.queue file 50 and perhaps modify the resource.queue file 50. In such case, retry is returned (at block 204). If (at block 214) the checksums match, then the calling process/thread 22a, 22b ... 22n calculates (at block 216) the checksum for the modified temporary queue file 120 and writes the calculated checksum into the checksum field 52 in the temporary queue file 120. The calculated checksum from the temporary queue file 120 is also written (at block 218) to the checksum field 78 in the queue lock file 72, currently named resource.lock 74 and the creation time 80 in the queue lock file 72 is set to the current system time. The temporary queue file 120 is renamed (at block 220) to resource.queue 50 to update the resource.queue 50 and the queue lock file 72 is then renamed (at block 222) to resource.clear 76 to release the lock on the resource.queue file 50. The calling process/thread 22a, 22b ... 22n then calls (at block 224) the modifyLease interface 40 to update either the resource.readlease file 90 or resource.writelease file 110 if a lease is granted to the process/thread 22a, 22b ... 22n to perform the requested read or write operations with respect to the shared resource 24a, 24b ... 24n.

Figure 5A:
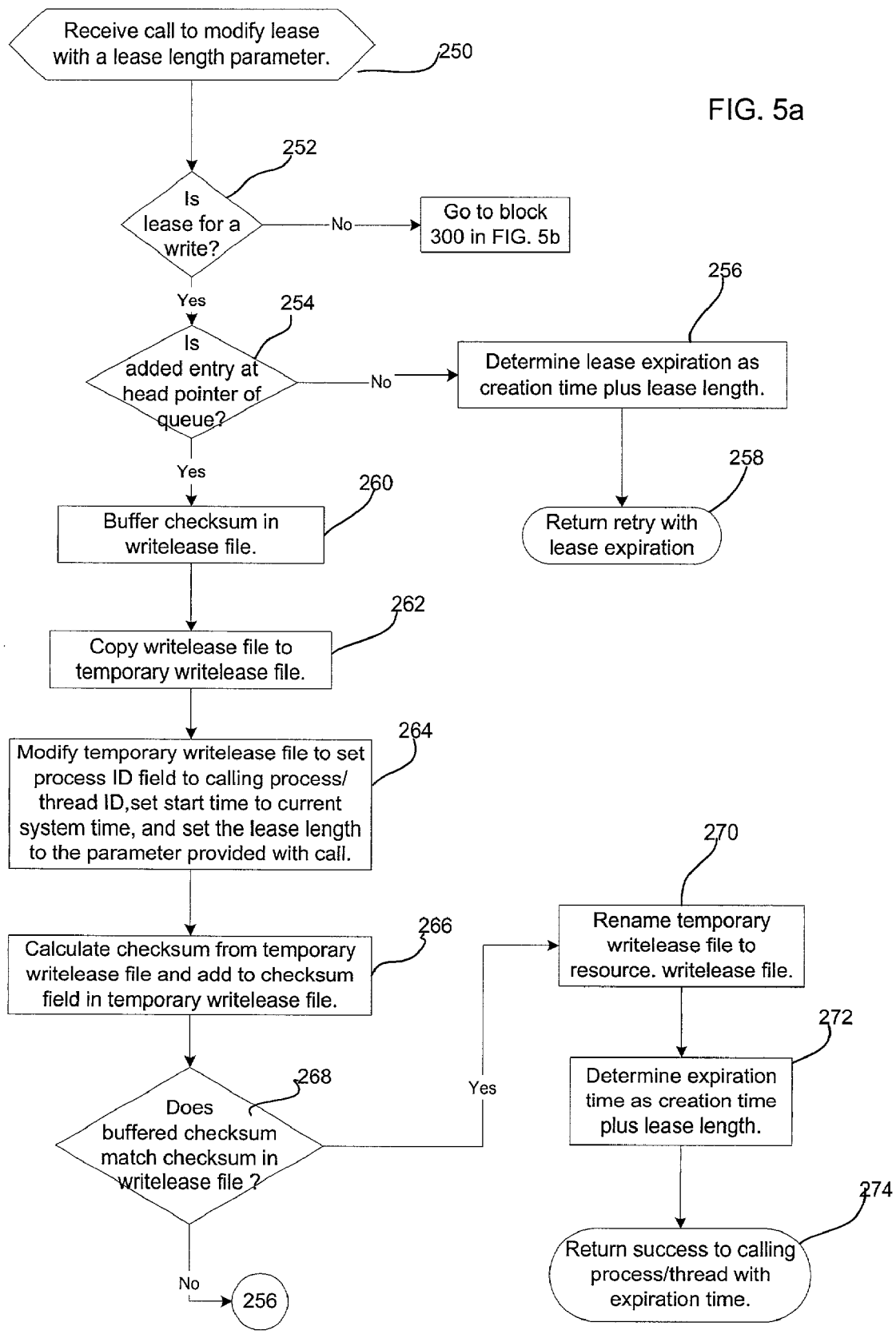
Figure 5B:
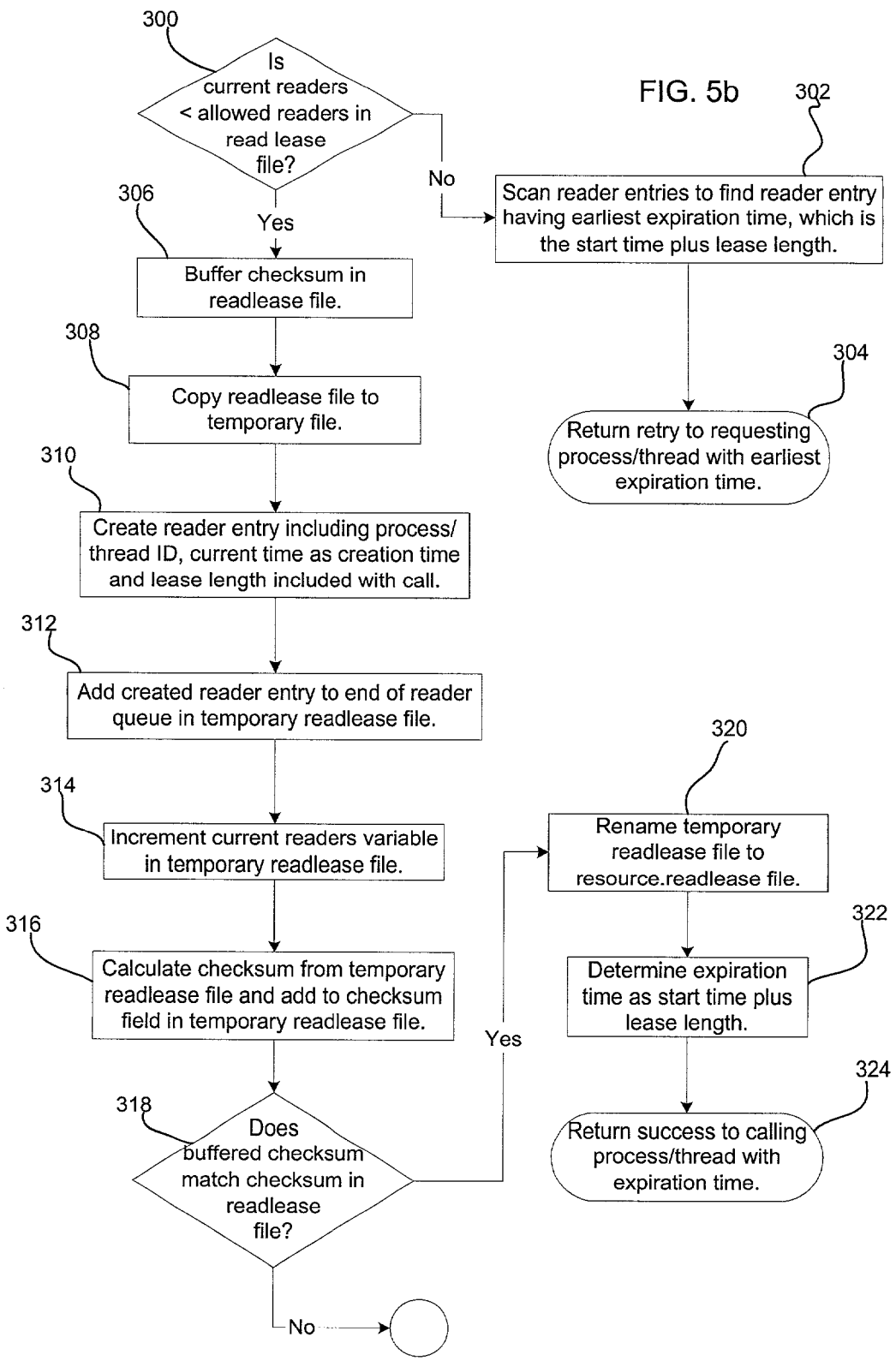

FIGS. 5a and 5b illustrate logic implemented in the modifyLease 40 interface to modify the resource.readlease file 90 or resource.writelease file 110 to grant the calling process/thread 22a, 22b ... 22n read or write access, respectively. Control begins at block 250 upon receiving a call to the modifyLease interface 40 from one process/thread 22a, 22b ... 22n requesting a read or write lease for a specified lease length period of time. If (at block 252) the lease is for a write and if (at block 254) the process ID of the calling process/thread 22a, 22b ... 22n is at the head pointer 56 of the I/O request list 54, then control proceeds to block 260 to grant the calling process/thread 22a, 22b ... 22n write access. If (at block 254) the process ID of the calling process/thread 22a, 22b ... 22n is not at the head pointer 56, then the lease expiration is determined (at block 256) as the sum of the lease length 118 value and the start time 116 value in the resource.writelease file 110. A retry with the determined lease expiration is then returned (at block 258) to the calling process/thread 22*a*, 22*b* . . . 22*n*.

If (at block 254) the identifier calling process/thread is at the head pointer 56 in the I/O request list 54, then the checksum 114 in the resource.writelease 110 is buffered (at block 260) and the resource.writelease 110 file is copied (at block 262) to a temporary writelease file 122. The process executing the modifyLease 40 code then modifies (at block 264) the temporary writelease file 122 to include the calling process/thread ID 22*a*, 22*b* . . . 22*n* in the process ID field 112, sets the start time 116 to the current system time, and sets the lease length field 118 to the lease length provided with the call to the modifyLease interface 40. The checksum of the temporary writelease file 122 is calculated (at block 266) and written to the checksum field 114 in the temporary writelease file 122. If (at block 268) the buffered checksum (which is not the checksum in the temporary writelease file 122) matches the checksum 114 in the resource.writelease file 110, then no other process/thread has modified or acquired a write lease while the calling process/thread 22*a*, 22*b* . . . 22*n* was accessing the write lease. If the file system 10*a*, 10*b* . . . 10*n* has allowed another process to modify the resource.writelease file 110, then control proceeds to block 256 to return retry with a lease expiration. Otherwise, if no other process has been allowed to pursue a write lease, then control proceeds to block 270 to assign the write lease to the calling process/thread 22*a*, 22*b* . . . 22*n* by renaming the temporary writelease file 122 to the name of the resource. writelease file 110. The expiration time is determined (at block 272) as the start time 116 plus the lease length 118 in the new resource.writelease file 110 and success is returned (at block 274) to the calling process/thread 22*a*, 22*b* . . . 22*n* with the determined expiration time. The calling process/thread 22*a*, 22*b* . . . 22*n* may then perform write operations to the shared resource 24*a*, 24*b* . . . 24*n* up until the expiration time.

If (at block 252) the calling process/thread 22*a*, 22*b* . . . 22*n* is requesting a nonexclusive read access to the shared resource 24*a*, 24*b* . . . 24*n*, then control proceeds to block 300 in FIG. 5*b*. If (at block 300) the number of current readers 98 in the resource.readlease file 90 is not less than the allowed readers 96, then the new request added to the I/O request list 54 in FIG. 4 may not obtain a non-exclusive read lease for the shared resource 24*a*, 24*b* . . . 24*n*. In such case, the process executing the modifyLease 40 interface scans (at block 302) the reader entries 100 in the reader list 92 to find the reader entry having the earliest expiration time, which is the start time 104 plus the lease length 106. Retry is returned (at block 304) to the calling process/thread 22*a*, 22*b* . . . 22*n* with the earliest expiration time of the reader entries in the reader list 92, which is the time at which the next read lease will expire. If (at block 300) more non-exclusive read leases can be granted, i.e., the number of current readers 98 is less than the allowed readers 96, then the checksum 108 in the resource.readlease file 90 is buffered (at block 306) and the readlease file is copied (at block 308) to a temporary readlease file 124. A reader entry 100 (FIG. 2) is created (at block 310) including the process ID 102 of the calling process/thread 22*a, b* . . . *n*, the current system time as the start time 104, and a lease length 106 equal to the lease length parameter provided with the modifyLease 40 interface. The generated reader entry 100 is then added (at block 312) to the end of the reader list 92 in the temporary readlease file 124. The number of current readers 98 in the temporary readlease file 124 is incremented (at block 314). The checksum for the modified temporary readlease file 124 is then calculated (at block 316) and the checksum is added to the checksum field 108 in the temporary resource.readlease file 124. If (at block 318) the buffered checksum does not match the checksum in the resource.readlease file 90, then control proceeds to block 302 to return the earliest expiration time of the process/threads 22*a*, 22*b* . . . 22*n* that currently are on the reader list 90. If the resource.readlease file 90 has not been modified by another intervening process, then the temporary readlease file 124 is renamed (at block 320) to resource.readlease 90. Further, the expiration time of the read lease for the calling process/thread 22*a*, 22*b* . . . 22*n* is determined as the start time 104 plus the lease length 106, and success is returned to the calling process/thread 22*a*, 22*b* . . . 22*n* with the determined expiration time. The calling process/thread 22*a*, 22*b* . . . 22*n* will then perform read operations with respect to the shared 24*a*, 24*b* . . . 24*n* up until the expiration time.

Those processes/threads 22*a*, 22*b* . . . 22*n* that were prevented from accessing the resource.queue file would attempt the retry after some predetermined period of time after receiving the retry request at block 204. A process/thread 22*a*, 22*b* . . . 22*n* that is on the I/O request list 54 in the resource.queue file 50 that is denied access to the write lease or read lease, for whatever reason, is provided the lease expiration time and may then retry to obtain a read or write lock upon the occurrence of the received expiration time, which indicates the time that at least one currently active lease expires, thereby providing an opening for the granting of a new lease to access the shared resource 24*a*, 24*b* . . . 24*n*.

FIG. 6 illustrates the logic of the dequeue interface 44 to remove a specified process ID from the I/O request list 54 and, if the request to dequeue is a read, also from the reader list 92. Control begins at block 350 upon receiving a request to dequeue a specified process ID. At block 352, the process executing the dequeue interface 44 performs the steps from block 202 through 210 in FIG. 4 to generate a temporary queue file 120 in order to modify the I/O request list 54 to remove the requested process ID. If (at block 354) the requested process ID is in the I/O request list, then the entry for the requested process ID is removed (at block 356) from the I/O request list 54 in the temporary queue file 120 and the pointers (at block 358) are adjusted to accommodate the removal of the entry. If the removed entry was at the top or bottom of the I/O request list 54, then the head pointer 56 or tail pointer 58, respectively, are adjusted to point to the new head or tail of the I/O request list 54.

If (at block 360) the buffered checksum from the resource-.queue file 50 does not match the checksum 52 and 78 in the resource.queue file 50 and queue lock file 72, respectively, then an intervening process has been allowed write access to the resource.queue file 50. In such case, retry is returned (at block 362) to the dequeue request. If the checksums match, then control proceeds to block 364 where steps 216 through 222 in FIG. 4 are performed to replace the resource.queue file 50 with the temporary queue file 120 in which the entry for the requested process ID is removed from the I/O request list 54. If (at block 370) the process ID was for a read request, then control proceeds to block 372 to attempt to remove the corresponding reader entry in the reader list 92; otherwise, if the request was a write, control ends (at block 384) by returning dequeue success to the calling process/thread. At block 372, the checksum 108 in the resource.readlease file 90 is buffered and the resource.readlease file 90 is copied (at block 374) to the temporary readlease file 124. The entry for the process ID to be dequeued is removed (at block 376) from the reader list 92 and the current readers 98 field is decremented in the temporary readlease file 124. The checksum of the modified temporary readlease file 124 is calculated (at block 378) and added to the checksum field 108 in the temporary readlease file 124. If (at block 380) the buffered checksum from the resource.readlease file 90 does not match the current checksum 108 in the resource.readlease file 90, then the file system has allowed another intervening process/thread to modify the resource.readlease file 90. In such case, retry is returned (at block 362) to the process/thread that called the dequeue process to cause the calling process to retry the dequeue operation in order to remove the reader entry 92 from the reader list 92 for the process ID removed from the I/O request list 54. If (at block 380) the checksums match, then no intervening process has modified the resource.readlease file 90 and the temporary readlease file 124 is renamed (at block 382) to the resource.readlease file 90 and dequeue success is returned (at block 384) to the calling process/thread.

Figure 7B:
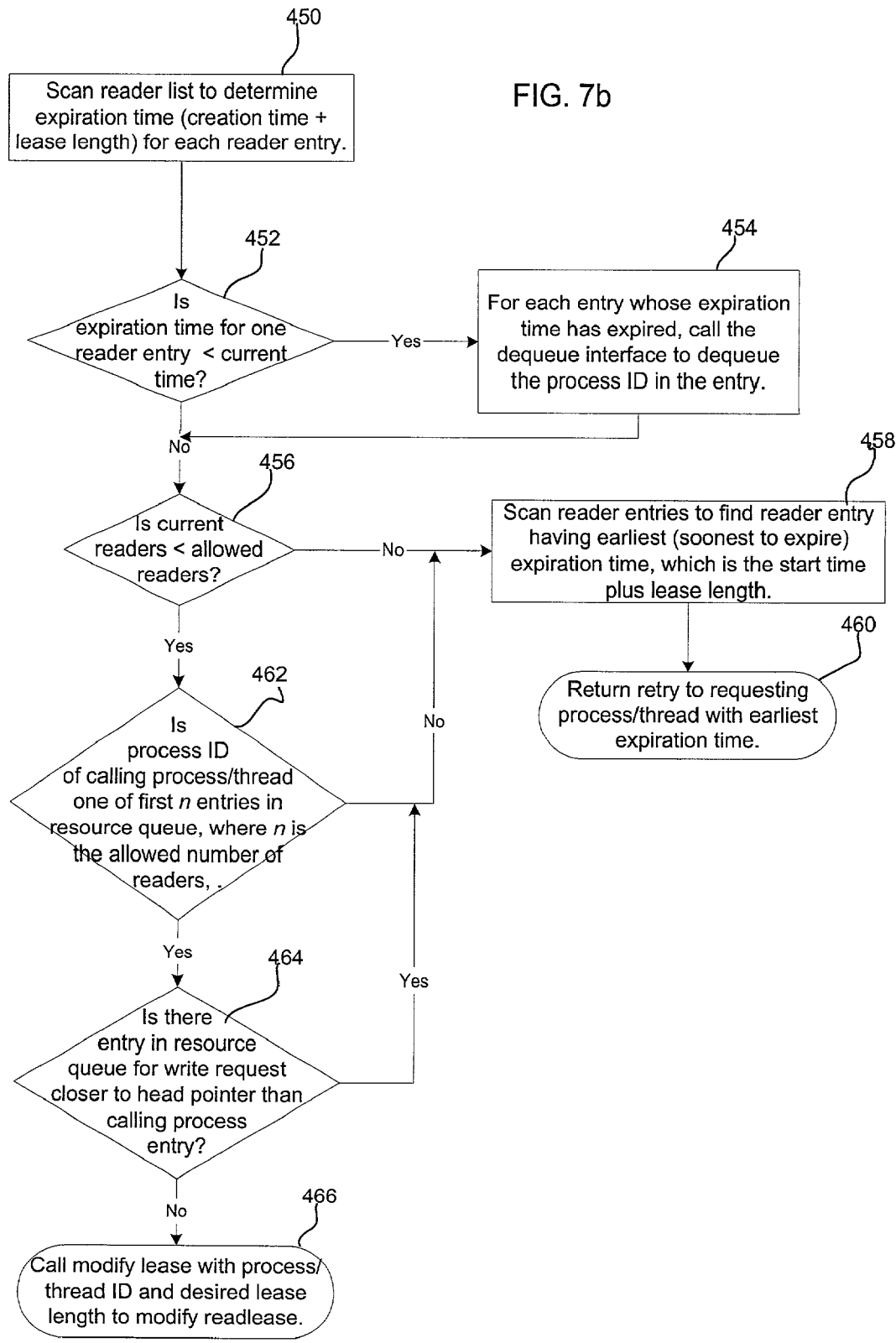

FIGS. 7a and 7b illustrate logic implemented in the amINext interface 42 which a process/thread 22a, 22b . . . 22n on the I/O request list 54 calls to retry to access the desired read or write lock. With respect to FIG. 7a, control begins at block 400 upon receiving a call to the amINext interface 42 from a calling process/thread 22a, 22b . . . 22n whose process ID is in the I/O request list 54. In certain implementations, the amINext interface 42 is called upon to detect if the read or write lease being sought has expired. If (at block 402) the request is for a write lease and if (at block 404) the current write lease has not expired, then a determination (at block 406) is made of the expiration time of the current write lease from the start time 116 and lease length 118 in the resource.writelease file 110, which is returned to the calling process/thread 22a, 22b . . . 22n with a retry.

If (at block 404) the current write lease, as indicated in the resource.writelease file 110, has expired, i.e., the start time 116 plus the lease length 118 is less than the current system time, then a determination is made (at black 408) as to whether the process ID of the calling process/thread 22a, 22b . . . 22n immediately follows the head pointer 56 (FIG. 2), i.e., is the next entry on the I/O request list 54. If not, then control proceeds to block 406 to return retry with the expiration time of the write lease. Otherwise, if (at block 408) the calling process/thread 22a, 22b . . . 22n follows the head pointer 56 in the I/O request list 54, then a determination is made (at block 410) whether the queue lock file 72 is named resource.clear 76, indicating that the lock on the resource.queue 50 is available. If so, then the dequeue interface 44, described with respect to FIG. 6, is called (at block 412) with the process ID of the entry at the head pointer 56 in the I/O request list 54.

If (at block 410), the queue lock file 72 is not named resource.clear 76, but (at block 414) is named resource.lock 74 and if (at block 416) the checksum 52 in the resource. queue file 50 does not match the checksum 78 in the queue lock 72 file named resource.lock 74, then a writer process/ thread 22a, 22b . . . 22n died after updating the checksum in the lock queue file 72 at block 218 in FIG. 4, but before renaming the temporary queue file 120 in the buffer to resource.queue 50, i.e., it froze after 220 and before reaching block 222 in FIG. 4. If such a situation occurs, then the process executing the amINext interface 42 renames (at block 420) the queue lock file 72 from resource.lock 74 to a temporary queue lock file 126. This step 420 will prevent any other processes executing the amINext interface 42 from concurrently trying to fix the queue lock 72. The resource. queue file 50 is read (at block 422) to the temporary queue file 120 and the entry at the head pointer 56 is removed (at block 424) and the head pointer 56 is adjusted to point to the entry following the removed entry. The checksum on the modified temporary queue file 120 is calculated (at block 426) and written to the checksum 52 field in the temporary queue file 120. The calculated checksum is further written (at block 428) to the checksum 78 in the temporary queue lock file 126, and the creation time 80 in the queue lock file 72 is set to the current time. The temporary queue file 120 is then renamed (at block 430) to resource.queue 50 and the temporary queue lock file 126 is renamed (at block 432) to resource.clear 76 indicating that no one holds the exclusive lock on the resource.queue file 50. The modifyLease interface 40 is then called (at block 434) with the calling process/thread process ID and the requested write lease length to update the resource.writelease 110 to provide the write lease to the calling process/thread 22a, b . . . n.

If (at block 416) the lock is held and the checksums 52 and 78 in the resource.queue file 50 and queue lock 72 match, then the file system 10a, 10b . . . 10n has improperly allowed another process to access the resource.queue 50 to attempt to obtain the write lease. In such case, control proceeds to block 418 to return retry to the calling process/thread 22a, 22b . . . 22n to retry later. Similarly, if (at block 414) neither the resource.lock 74 or resource.clear 76 is available, then some other process is performing the steps at blocks 420 et seq. to fix the queue lock file 72. In such case, control proceeds to block 418 to return retry.

If (at block 402) the request is for a read, then control proceeds to block 450 in FIG. 7b where the process executing the amINext interface 42 scans the reader list 92 in the resource.readlease file 90 to determine the expiration time for each reader entry 100, which is the start time 104 plus the lease length. If (at block 452) the expiration time for one reader entry 100 is less then the current time, i.e., the reader lease has expired for that reader entry, then for each reader entry in the reader list 54 that has expired, the process/thread executing the amINext interface 42 calls the dequeue interface 44 to remove that expired reader entry from the reader list 90 and the corresponding entry in the I/O request list 54. From block 454 or 452, control proceeds to block 456 to determine whether the current readers 98 is less than the allowed readers 96. If not, the reader list 92 is scanned (at block 458) to find the reader entry 100 having the earliest (or next to expire) expiration time, which is the start time 104 plus the lease length 106. Retry is then returned (at block 460) with the earliest expiration time. If (at block 456) additional readers are allowed, then a determination is made (at block 462) as to whether the entry in the I/O request list 54 for the process ID of the calling thread is one of the first n entries in the list 54 and whether (at block 464) there is no write entry in the I/O request list 54, as indicated by the I/O flag 55, between the entry for the calling process/thread and the head pointer 56. From the no branch of block 464, the modifyLease interface 40 is called (at block 466) to provide the calling process/thread ID a read lease. Otherwise, if (at block 462) the entry is not one of the first n entries or if (at block 464) there is a write request higher-up on the queue, then control proceeds to block 458 to return retry with the earliest read expiration time.

Figure 8:
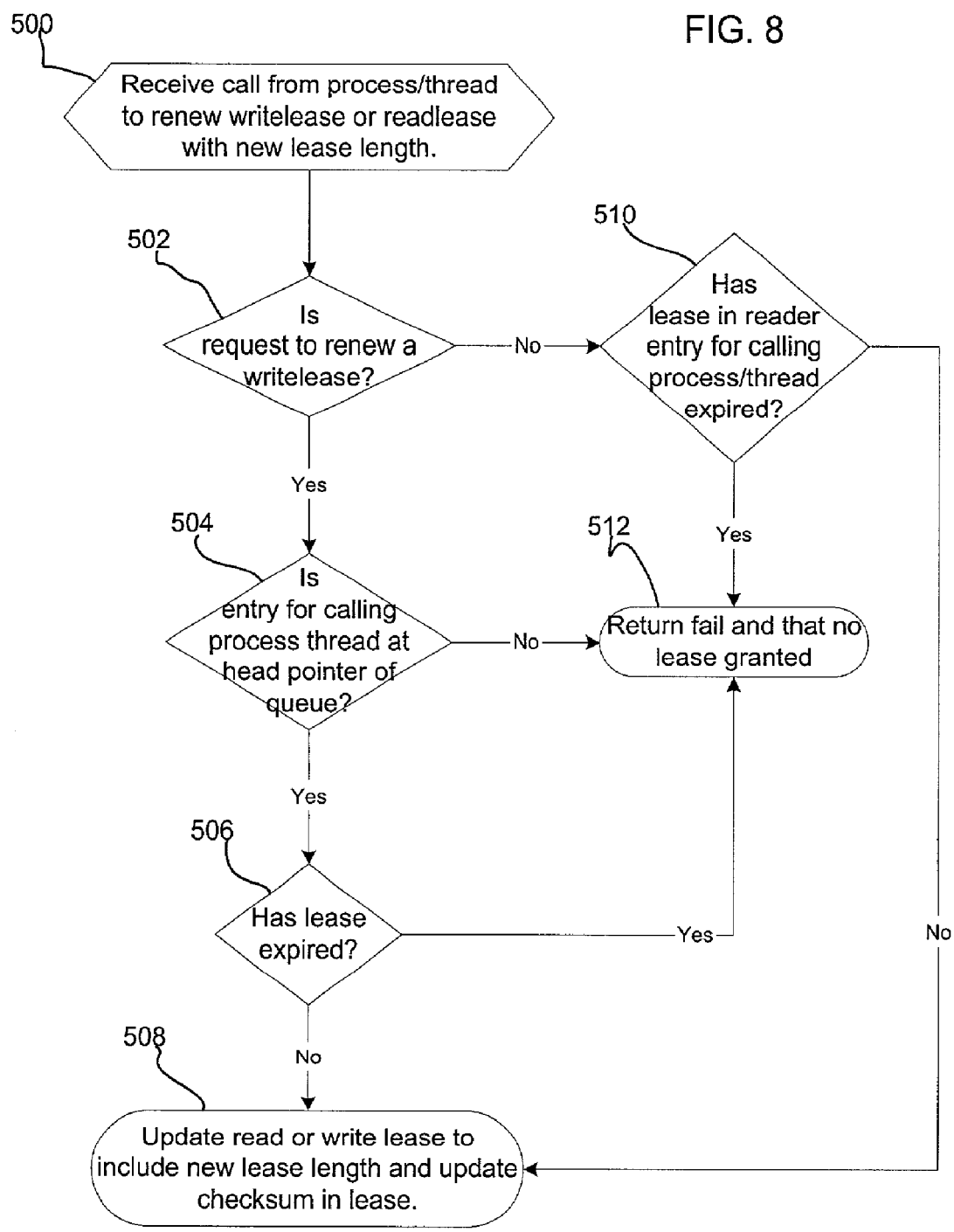

FIG. 8 illustrates logic implemented in the renewLease 38 interface for a process/thread 22a, 22b . . . 22n already holding a read/write lease to extend the length of the lease. Control begins at block 500 upon receiving a call from a process/thread to renew or extend the lease length for a read or write lease. If (at block 502) the request is to renew a write lease and if (at block 504) the entry for the calling process/ thread in the I/O request list 54 is at the head pointer 56 and if (at block 506) the lease has not expired, i.e., the start time 116 plus lease length 118 is greater than the current system time, then the process executing the renewLease interface 38 updates (at block 508) the lease length 118 in the resource.writelease file 110. If (at block 502) the entry in the I/O request list 54 for the calling process ID is for a read, as indicated by the I/O flag column 55, and if (at block 510) the read lease has not expired, i.e., the start time 104 and lease length 106 in the reader entry 100 for the calling process ID is greater than the current system time, then control proceeds to block 508 to update the lease length 106 in the reader entry for the calling process/thread and the checksum 108 in the resource.readlease file 90. If (at block 506) the read or write lease has expired or if (at block 504) the request to update the lease length is for a write that is not at the head of the I/O request list 54, then fail is returned (at block 512)

In the above described implementations, a rename operation is used to implement the locking mechanism communication variable. In particular, a process/thread obtains a lock by performing a standard file rename operation, that is implemented in most operating systems. Because the rename operation is atomic, i.e., the operation is guaranteed to result in a success or failure with no other possible states, only one process/thread can obtain the exclusive write lock for the resource.queue file 50 by renaming the queue lock file 72. Further, only one process/thread can update the read and write leases 90 and 110 at a time because only one can succeed in renaming the temporary write 122 and read 124 lease files to the resource.readlease 90 and resource.writelease 110 files.

The described implementations implement a locking scheme that will work across operating system platforms because the locking scheme is implemented using basic file system commands that operate in the same manner in most computer platforms. The cross-platform language in which the locking mechanism is implemented would include calls to interfaces that utilize basic file system commands that are readily translated by the virtual machine to native operating system commands that operate in basically the same manner across operating system platforms. For instance, read, write and rename commands perform basically the same set of operations across file systems in different operating systems. In this way, the locking mechanism functions in the same manner across operating system platforms, thereby providing a locking system for a cross-platform programming language, such as Java.

Figure 9:
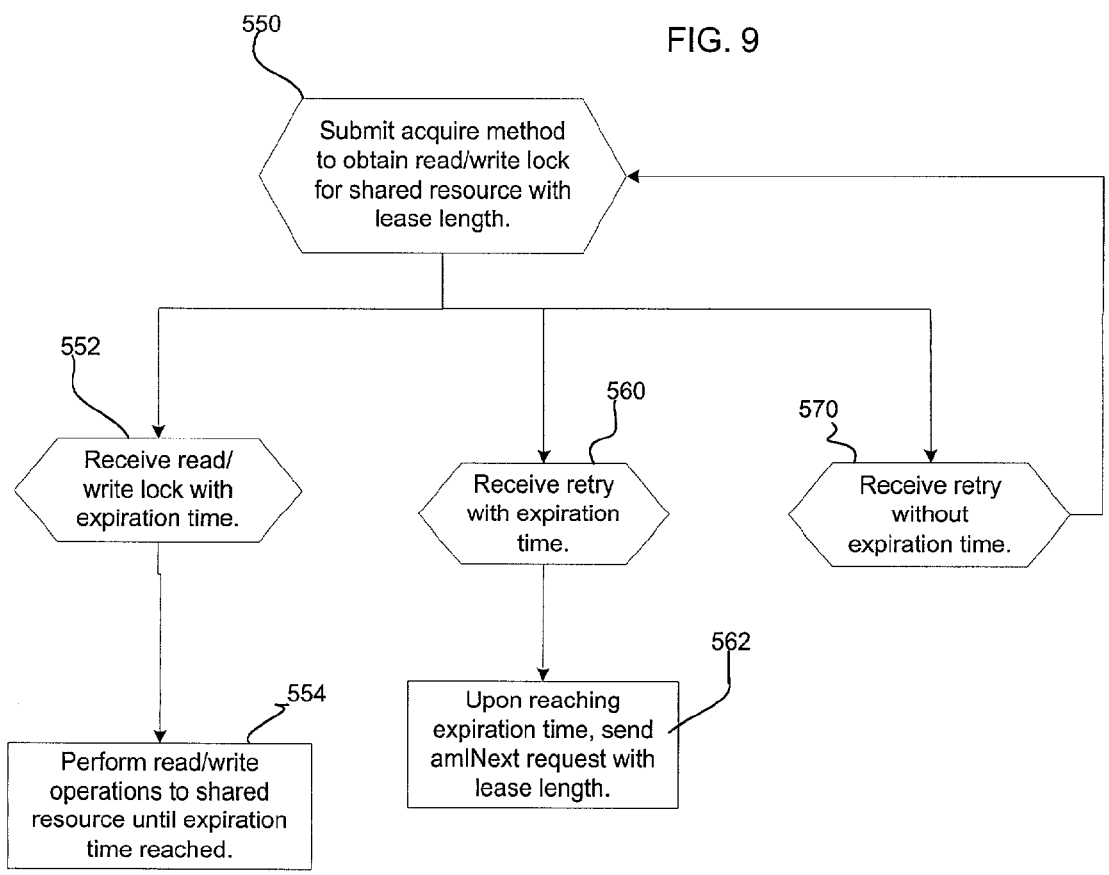

FIG. 9 illustrates logic implemented in the application program 2 (FIG. 1a) to interact with the locking mechanism described above to obtain a lock on a shared resource 24a, 24b . . . 24n. At block 550, the application 2 calls the acquire method 36 to obtain a read or write lock on a shared resource. At block 552, the application 2 receives the read/write lock with an expiration time and, in response, performs (at block 554) read/write operations until the system time is at or later than the expiration time. At block 560, the application receives retry with an expiration time, which would occur after an entry for the request is added to the I/O request list 54 and the lease cannot be modified at block 256 in FIG. 5a or 304 in FIG. 5b. Upon detecting that the system time is at or later than the expiration time, the application 2 calls the amINext interface 42 to retry to access the lock. If (at block 570) retry is received without an expiration time, then the resource.queue file 50 could not be accessed at block 204 in FIG. 4. In such case, the acquire interface is retried after some predetermined time or immediately.

In an alternative implementation, upon adding the request to the I/O request list 54 at block 22, success can be returned. In response to success being returned in response to a call to the acquire interface, the calling process/thread can then call the modifyLease interface 40.

Additional Implementation Details

The above described method, apparatus or article of manufacture for providing a locking mechanism may be implemented using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium such as magnetic storage medium (e.g., hard disk drives, floppy disks, tape, etc.), optical storage (e.g., CD-ROMs, optical disks, etc.), volatile and non-volatile memory devices (e.g., EEPROMs, ROMs, PROMs, RAMs, DRAMs, SRAMs, flash memory, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the discussed implementations, the application was implemented in the Java cross-platform language. However, the described implementations may apply to any cross-platform computer language known in the art, such as Python, Perl, etc. Alternatively, the described locking mechanism can be used with programs written in any computer language known in the art, including languages that are intended to operate on only one operating system, i.e., are not cross-platform, such as C, Fortran, etc.

In the described implementations, an exclusive lock was provided for write access to the resource and a non-exclusive lock provided for read access. In alternative implementations, exclusive or non-exclusive access can be granted for operations other than read or write. For instance, the exclusive or non-exclusive operation can relate to controlling the operation of a resource in a manner that does not involve read and write operations with respect to the shared resource. Still further, the shared resource may be external to the file system and operating system in which the locking mechanism is implemented. In such case, different processes interested in accessing the shared resource, which may comprise any type of hardware, software, mechanical or other device or item capable of being shared, would submit exclusive and non-exclusive access requests through the file system 10a, 10b . . . 10n.

Time measurements for the lease length may be determined by a common system clock used by the operating system 4a, 4b . . . 4n as well as the application process/threads. In alternative implementations, components other than a common system clock, such as multiple clocks, time stamps, etc., may be used to determine and implement the time measurement operations described herein.

In the described implementations, the write and read lease information was maintained in files separate from the queue file (resource.queue). In alternative implementations, the write and read lease information may be included in the queue file.

In described implementations, the I/O request list 54 and the reader list 92 implement first-in-first-out (FIFO) queues. In alternative implementations, different queue ordering schemes may be used to determine the order in which queued I/O requests are granted access to the shared resource.

In additional implementations, priority schemes may be used to increase or decrease the priority ordering of I/O requests in the I/O request list 54 and/or the reader list 92 to alter the order in which requests are granted access to the shared resource 24*a*, 24*b* . . . 24*n*

In described implementations, the processes would retry to access a lease, i.e., the amINext interface, upon detecting that the current lease has expired. In alternative implementations, processes may retry to access the lease at predetermined time intervals, without regard to when the current lease expires.

In the described implementations, calls to the interfaces of the locking class were made from processes or threads. In described implementations, the term process may refer to any process, thread or any other executing entity in the operating system capable of calling interfaces FIGS. 4, 5*a*, 5*b*, 6, 7*a*, 7*b*, 8, and 9 described specific operations occurring in a particular order. In alternative implementations, certain of the logic operations may be performed in a different order, modified or removed and still perform in accordance with implementations of the present invention. Morever, steps may be added to the above described logic and still conform to implementations of the invention. Further, operations described herein may occur sequentially or certain operations may be processed in parallel.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

** JAVA is a trademark of Sun Microsystems, Inc.

What is claimed is:

1. A method for implementing a locking mechanism to control access to a shared resource, comprising:
receiving a request to access the shared resource;
determining whether a first file has a first name;
renaming the first file to a second name if the first file has the first name;
updating a second file to indicate the received request in a queue of requests to the shared resource if the first file is renamed to the second name, wherein an ordering of the requests in the queue is used to determine whether access to the shared resource is granted to the request;
reading and buffering a checksum from the second file before updating the second file; and
renaming the first file to the first name after the second file is updated.

2. The method of claim 1, wherein updating the second file further comprises:
copying the second file to a temporary file;
updating the temporary file to indicate the received request; and
if the buffered checksum and checksum in the second file match, then replacing the second file with the updated temporary file.

3. The method of claim 2, further comprising:
calculating a revised checksum from the updated temporary file; and
including the revised checksum in the updated temporary file before replacing the second file with the updated temporary file.

4. The method of claim 2, further comprising:
returning retry if the buffered checksum and checksum in the second file do not match,
wherein the second file is not replaced with the updated temporary file if there is no match.

5. The method of claim 1, wherein the check sum is maintained in both the first file and the second file and the updating the second file further comprises:
copying the second file to a temporary file, wherein the temporary file is updated to indicate the received request; and
if the buffered checksum and the checksum in both the first file and second file all match, then replacing the second file with the updated temporary file.

6. The method of claim 5, further comprising:
calculating a revised checksum from the updated temporary file;
including the revised checksum in the updated temporary file before replacing the second file with the temporary file; and
including the revised checksum in the first file before renaming the first file to the first name.

7. The method of claim 1, wherein a lease data structure indicates at least one request indicated in the queue in the second file granted access to the shared resource and, for each request granted access to the shared resource, a lease time during which the request is granted access to the shared resource, further comprising:
determining whether one request in the queue is permitted access to the shared resource based on the ordering of the requests in the queue;
updating the lease data structure to indicate the determined request and the lease time if the determined request is permitted access to the shared resource; and
returning a message to the determined request indicating that access to the shared resource is granted and the lease time during which access is granted.

8. The method of claim 7, wherein the request to access is for exclusive access to the shared resource, wherein determining whether one request in the queue is permitted access to the shared resource further comprises:
determining the request following the request at a top of the queue after determining that the lease time has expired;
removing the request at the top of the queue;
updating the queue to indicate the determined request at the top of the queue; and
updating the lease data structure to identify the determined request and set a new lease time for the determined request in the lease data structure during which the request has exclusive access to the shared resource.

9. The method of claim 8, wherein the queue and lease structure are updated after renaming the first file from the first name to the second name.

10. The method of claim 7, wherein the lease data structure comprises a file and wherein updating the lease data structure further comprises:
reading and buffering a checksum from the lease data structure;
copying the lease data structure to a temporary lease file, wherein the temporary lease file is updated to indicate the determined request and the new lease time; and
if the buffered checksum and checksum in the lease data structure match, then replacing the lease data structure with the temporary lease file.

11. The method of claim 7, wherein the request to access is for non-exclusive access to the shared resource and wherein the lease data structure indicates a number of requests allowed simultaneous access to the shared resource, wherein determining whether one considered request in the queue is permitted access to the shared resource further comprises:
determining whether a number of current readers is less than the allowed readers;
determining whether less than the number of current readers precedes the considered request in the queue;
updating the lease data structure to identify the considered request and set a new lease time for the considered request to have non-exclusive access to the shared resource if the number of current readers is less than the allowed readers and less than the number of current readers precedes the considered request in the queue; and
incrementing the number of current readers after updating the lease data structure to indicate the considered request.

12. The method of claim 11, further comprising:
removing one request for non-exclusive access from the queue whose lease time has expired;
removing indication from the lease data structure of the request removed from the queue; and
decrementing a field in the lease data structure indicating the number of current readers.

13. The method of claim 11, wherein the queue is capable of including entries for exclusive and non-exclusive access to the shared resource, and wherein the lease data structure is updated to indicate the considered request and set a new least time for the considered request to have non-exclusive access to the shared resource if there is no exclusive access request between a top of the queue and the considered request.

14. The method of claim 7, further comprising:
returning a retry message to the request indicating to retry the request to access the shared resource and the lease time if the request is determined not to be permitted access to the shared resource, wherein the request is retried after the lease time has expired.

15. The method of claim 1, further comprising:
receiving a request to remove an entry from the queue;
determining whether the first file has the first name;
renaming the first file to the second name if the first file has the first name; updating the second file to indicate that the request is removed from the queue; and
renaming the first file to the first name after the second file is updated.

16. The method of claim 1, wherein the locking mechanism is capable of being executed on multiple operating system platforms, and wherein the steps of renaming and updating correspond to native operating system commands implemented across operating system platforms.

17. The method of claim 16, wherein the locking mechanism is implemented in a cross-platform computer programming language that is called by applications seeking to access the shared resource.

18. The method of claim 17, wherein the cross-platform computer programming language comprises Java.

19. The method of claim 1, wherein the shared resource comprises a data structure and wherein the access comprises one of read or write access to the shared data structure.

20. A system for implementing a locking mechanism to control access to a shared resource, comprising;
a file system;
a processor in communication with a first computer readable medium and file system;
code implemented in the first computer readable medium executed by the processor to cause the processor to perform:
(i) receiving a request to access the shared resource;
(ii) determining whether a first file in the file system has a first name;
(iii) renaming the first file to a second name if the first file has the first name;
(iv) updating a second file in the file system to indicate the received request in a queue of requests to the shared resource if the first file is renamed to the second name, wherein an ordering of the requests in the queue is used to determine whether access to the shared resource is granted to the request;
(v) reading and buffering a checksum from the second file the computer readable medium before updating the second file; and
(vi) renaming the first file to the first name after the second file is updated.

21. The system of claim 20, further comprising:
a computer readable medium,
wherein the code far updating the second file further causes the processor to perform:
(i) copying the second file to a temporary file;
(ii) updating the temporary file to indicate the received request; and
(iii) if the buffered checksum and checksum in the second file match, then replacing the second file with the updated temporary file.

22. The system of claim 20, further comprising:
a computer readable medium;
a lease data structure in the computer readable medium indicating at least one request indicated in the queue in the second file granted access to the shared resource and, for each request granted access to the shared resource, a lease time during which the request is granted access to the shared resource;
wherein the code further causes the processor to perform:
(i) determining whether one request in the queue is permitted access to the shared resource based on the ordering of the requests in the queue;
(ii) updating the lease data structure to indicate the determined request and the lease time if the determined request is permitted access to the shared resource; and (iii) returning a message to the determined request indicating that access to the shared resource is granted and the lease time during which access is granted.

23. The system of claim 22, wherein the request to access is for exclusive access to the shared resource, wherein the code causing the processor to determine whether one request in the queue is permitted access to the shared resource further causes the processor to perform:
determining the request following the request at a top of the queue after determining that the lease time has expired;
removing the request at the top of the queue;
updating the queue to indicate the determined request at the top of the queue; and
updating the lease data structure to identify the determined request and set a new lease time for the determined request in the lease data structure during which the request has exclusive access to the shared resource.

24. The system of claim 22, wherein the request to access is for non-exclusive access to the shared resource and wherein the lease data structure indicates a number of requests allowed simultaneous access to the shared resource, wherein the code causing the processor to determine whether one considered request in the queue is permitted access to the shared resource further causes the processor to perform:
determining whether a number of current readers is less than the allowed readers;
determining whether less than the number of current readers precedes the considered request in the queue;
updating the lease data structure to identify the considered request and set a new lease time for the considered request to have non-exclusive access to the shared resource if the number of current readers is less than the allowed readers and less than the number of current readers precedes the considered request in the queue; and
incrementing the number of current readers after updating the lease data structure to indicate the considered request.

25. The system of claim 20, wherein the code further causes the processor to perform:
receiving a request to remove an entry from the queue;
determining whether the first file has the first name;
renaming the first file to the second name if the first file has the first name; updating the second file to indicate that the request is removed from the queue; and
renaming the first file to the first name after the second file is updated.

26. The system of claim 20, wherein the locking mechanism is capable of being executed on multiple operating system platforms, and wherein the steps of renaming and updating correspond to native operating system commands implemented across operating system platforms.

27. The system of claim 20, wherein the shared resource comprises a data structure and wherein the access comprises one of read or write access to the shared data structure.

28. A system for implementing a locking mechanism to control access to a shared resource, comprising:
a file system implemented including a first file and a second file;
means for receiving a request to access the shared resource;
means for determining whether the first file has a first name;
means for renaming the first file to a second name if the first file has the first name;
means for updating the second file to indicate the received request in a queue of requests to the shared resource if the first file is renamed to the second name, wherein an ordering of the requests in the queue is used to determine whether access to the shared resource is granted to the request and wherein the means for updating the second file further performs reading and buffering a checksum from the second file in the computer readable medium before updating the second file; and
means renaming the first file to first name after the second file is updated.

29. The system of claim 28, further comprising:
a computer readable medium;
wherein the means for updating the second file further performs:
(i) copying the second file to a temporary file in the file system;
(ii) updating to temporary file to indicate the received request; and
(iii) if the buffered checksum and checksum in the second file match, then replacing the second file with the updated temporary file.

30. The system of claim 28 wherein the checksum is maintained in both the first file and the second file and the system; further comprising:
a computer readable medium;
wherein the means for updating the second file further performs:
(i) copying the second file to a temporary file in the file system, wherein the temporary file is updated to indicate the received request; and
(ii) if the buffered checksum and the checksum in both the first file and second file all match, then replacing the second file with the updated temporary file.

31. The system of claim 28, further comprising:
a computer readable medium;
a lease data structure in the compute readable medium that indicates at least one request indicated in the queue in the second file granted access to the shared resource and, for each request granted access to the shared resource, a lease time during which the request is granted access to the shared resource;
means for determining whether one request in the queue is permitted access to the shared resource based on the ordering of the requests in the queue;
means for updating the lease data structure to indicate the determined request and the lease time if the determined request is permitted access to the shared resource; and
means for returning a message to the determined request indicating that access to the shared resource is granted and the lease time during which access is granted.

32. The system of claim 31, wherein the request to access is for exclusive access to the shared resource, wherein the means for determining whether one request in the queue is permitted access to the shared resource further performs:
determining the request following the request at a top of the queue after determining that the lease time has expired;
removing the request at the top of the queue;
updating the queue to indicate the determined request at the top of the queue; and
updating the lease data structure to identify the determined request and set a new lease time for the determined request in the lease data structure during which the request has exclusive access to the shared resource.

33. The system of claim 31, wherein the lease data structure comprises a file and wherein the means for updating the lease data structure further performs:
  reading and buffering a checksum from the lease data structure;
  copying the lease data structure to a temporary lease file, wherein the temporary lease file is updated to indicate the determined request and the new lease time; and
  if the buffered checksum and checksum in the lease data structure match, then replacing the lease data structure with the temporary lease file.

34. The system of claim 31, wherein the request to access is for non-exclusive access to the shared resource and wherein the lease data structure indicates a number of requests allowed simultaneous access to the shared resource, wherein the means for determining whether one considered request in the queue is permitted access to the shared resource further performs:
  determining whether a number of current readers is less than the allowed readers;
  determining whether less than the number of current readers precedes the considered request in the queue;
  updating the lease data structure to identify the considered request and set a new lease time for the considered request to have non-exclusive access to the shared resource if the number of current readers is less than the allowed readers and less than the number of current readers precedes the considered request in the queue; and
  incrementing the number of current readers after updating the lease data structure to indicate the considered request.

35. The system of claim 31, further comprising:
  means for returning a retry message to the request indicating to retry the request to access the shared resource and the lease time if the request is determined not to be permitted access to the shared resource, wherein the request is retried after the lease time has expired.

36. The system of claim 28, further comprising:
  means for receiving a request to remove an entry from the queue;
  means for determining whether the first file has the first name;
  means for renaming the first file to the second name if the first file has the first name;
  means for updating the second file to indicate that the request is removed from the queue; and
  means for renaming the first file to the first name after the second file is updated.

37. The system of claim 28, wherein the locking mechanism is capable of being executed on multiple operating system platforms, and wherein the means for renaming and updating utilize native operating system commands implemented across operating system platforms.

38. The system of claim 37, wherein the locking mechanism is implemented in a cross-platform computer programming language that is called by applications seeking to access the shared resource.

39. The system of claim 28, wherein the shared resource comprises a data structure and wherein the access comprises one of read or write access to the shared data structure.

40. An article of manufacture including code for implementing a locking mechanism to control access to a shared resource, wherein the code causes operations to be performed comprising:
  receiving a request to access the shared resource;
  determining whether a first file has a first name;
  renaming the first file to a second name if the first file has the first name;
  updating a second file to indicate the received request in a queue of requests to the shared resource if the first file is renamed to the second name, wherein an ordering of the requests in the queue is used to determine whether access to the shared resource is granted to the request;
  reading and buffering a checksum from the second file before updating the second file; and
  renaming the first file to the first name after the second file is updated.

41. The article of manufacture of claim 40, wherein updating the second file further comprises:
  copying the second file to a temporary file;
  updating the temporary file to indicate the received request; and
  if the buffered checksum and checksum in the second file match, then replacing the second file with the updated temporary file.

42. The article of manufacture of claim 41, further comprising:
  calculating a revised checksum from the updated temporary file; and
  including the revised checksum in the updated temporary file before replacing the second file with the updated temporary file.

43. The article of manufacture of claim 41, further comprising:
  returning retry if the buffered checksum and checksum in the second file do not match, wherein the second file is not replaced with the updated temporary file if there is no match.

44. The article of manufacture of claim 40, wherein the checksum is maintained in both the first file and the second file and the updating the second file further comprises:
  copying the second file to a temporary file, wherein the temporary file is updated to indicate the received request; and
  if the buffered checksum and the checksum in both the first file and second file all match, then replacing the second file with the updated temporary file.

45. The article of manufacture of claim 44, further comprising:
  calculating a revised checksum from the updated temporary file;
  including the revised checksum in the updated temporary file before replacing the second file with the temporary file; and
  including the revised checksum in the first file before renaming the first file to the first name.

46. The article of manufacture of claim 40, wherein a lease data structure indicates at least one request indicated in the queue in the second file granted access to the shared resource and, for each request granted access to the shared resource, a lease time during which the request is granted access to the shared resource, further comprising:
  determining whether one request in the queue is permitted access to the shared resource based on the ordering of the requests in the queue;
  updating the lease data structure to indicate the determined request and the lease time if the determined request is permitted access to the shared resource; and
  returning a message to the determined request indicating that access to the shared resource is granted and the lease time during which access is granted.

47. The article of manufacture of claim 46, wherein the request to access is for exclusive access to the shared resource, wherein determining whether one request in the queue is permitted access to the shared resource further comprises:

determining the request following the request at a top of the queue after determining that the lease time has expired;

removing the request at the top of the queue;

updating the queue to indicate the determined request at the top of the queue; and updating the lease data structure to identify the determined request and set a new lease time for the determined request in the lease data structure during which the request has exclusive access to the shared resource.

48. The article of manufacture of claim 47, wherein the queue and lease structure are updated after renaming the first file from the first name to the second name.

49. The article of manufacture of claim 46, wherein the lease data structure comprises a file and wherein updating the lease data structure further comprises:

reading and buffering a checksum from the lease data structure;

copying the lease data structure to a temporary lease file, wherein the temporary lease file is updated to indicate the determined request and the new lease time; and if the buffered checksum and checksum in the lease data structure match, then replacing the lease data structure with the temporary lease file.

50. The article of manufacture of claim 46, wherein the request to access is for non-exclusive access to the shared resource and wherein the lease data structure indicates a number of requests allowed simultaneous access to the shared resource, wherein determining whether one considered request in the queue is permitted access to the shared resource further comprises:

determining whether a number of current readers is less than the allowed readers;

determining whether less than the number of current readers precedes the considered request in the queue;

updating the lease data structure to identify the considered request and set a new lease time for the considered request to have non-exclusive access to the shared resource if the number of current readers is less than the allowed readers and less than the number of current readers precedes the considered request in the queue; and incrementing the number of current readers after updating the lease data structure to indicate the considered request.

51. The article of manufacture of claim 50, further comprising:

removing one request for non-exclusive access from the queue whose lease time has expired;

removing indication from the lease data structure of the request removed from the queue; and decrementing a field in the lease data structure indicating the number of current readers.

52. The article of manufacture of claim 50, wherein the queue is capable of including entries for exclusive and non-exclusive access to the shared resource, and wherein the lease data structure is updated to indicate the considered request and set a new least time for the considered request to have non-exclusive access to the shared resource if there is no exclusive access request between a top of the queue and the considered request.

53. The article of manufacture of claim 46, further comprising:

returning a retry message to the request indicating to retry the request to access the shared resource and the lease time if the request is determined not to be permitted access to the shared resource, wherein the request is retried after the lease time has expired.

54. The article of manufacture of claim 40, further comprising:

receiving a request to remove an entry from the queue;

determining whether the first file has the first name;

renaming the first file to the second name if the first file has the first name; updating the second file to indicate that the request is removed from the queue; and renaming the first file to the first name after the second file is updated.

55. The article of manufacture of claim 40, wherein the locking mechanism is capable of being executed on multiple operating system platforms, and wherein the steps of renaming and updating correspond to native operating system commands implemented across operating system platforms.

56. The article of manufacture of claim 55, wherein the locking mechanism is implemented in a cross-platform computer programming language that is called by applications seeking to access the shared resource.

57. The article of manufacture of claim 56, wherein the cross-platform computer programming language comprises Java.

58. The article of manufacture of claim 40, wherein the shared resource comprises a data structure and wherein the access comprises one of read or write access to the shared data structure.

59. A computer readable medium including data structures for implementing a locking mechanism to control access to a shared resource, comprising:

a first file having one of a first name or a second name, wherein in response to receiving a request to access the shared resource, the first file is renamed to the second name if the first file has the first name;

a second file indicating a queue of requests to the shared resource, wherein an ordering of the requests in the queue is used to determine whether access to the shared resource is granted to the request, and wherein the second file is updated to indicate the received request in the queue when the first file is renamed to the second name, wherein the first file is renamed to the first name alter the second file is updated; and a checksum field in the second file, wherein the checksum is buffered before updating the second file.

60. The computer readable medium of claim 59, further comprising:

a temporary file, wherein the second file is copied to the temporary file and the temporary file is updated to indicate the received request, wherein the second file is replaced with the updated temporary file if the buffered checksum and checksum in the second file match.

61. The computer readable medium of claim 59, further comprising:

a lease data structure indicating at least one request indicated in the queue in the second file granted access to the shared resource and, for each request granted access to the shared resource, a lease time during which the request is granted access to the shared resource, wherein determining whether one request in the queue is permitted access to the shared resource is based on the ordering of the requests in the queue, and wherein the lease data structure is updated to indicate the determined request and the lease time if the determined request is permitted access to the shared resource.

62. The computer readable medium of claim 61, wherein the lease data structure comprises a file, further comprising:
- a checksum field within the lease data structure, wherein the checksum from the checksum field is buffered when updating the lease data structure; and
- a temporary lease file, wherein updating the lease data structure involves copying the lease data structure to the temporary lease file, wherein the temporary lease file is updated to indicate the determined request following the request at the top of the queue and the new lease time, wherein if the buffered checksum and checksum in the lease data structure match, then the lease data structure is replaced with the temporary lease file.

63. The computer readable medium of claim 61, wherein the request to access is for non-exclusive access to the shared resource, further comprising:
- a number of allowed readers allowed simultaneous access to the shared resource indicated in the lease data structure, wherein the lease data structure is updated to identify the considered request and set a new lease time for the considered request to have nonexclusive access to the shared resource if a number of current readers is less than the allowed readers and less than the number of current readers preceding the considered request in the queue, wherein the number of current readers is incremented after updating the lease data structure to indicate the considered request.

* * * * *

UNITED STATES PATENT AND TRADEMARK OFFICE
CERTIFICATE OF CORRECTION

PATENT NO.         : 7,107,267 B2                                                 Page 1 of 1
APPLICATION NO. : 10/066362
DATED              : September 12, 2006
INVENTOR(S)        : Julian S. Taylor It is certified that error appears in the above-identified patent and that said Letters Patent is hereby corrected as shown below:

In column 16, at line 35, insert --in-- after "file".

In column 16, at line 42, delete "far" and insert --for--.

In column 18, at line 12, insert --the-- between "to" and "first".

In column 18, at line 20, after "updating", delete "to" and insert --the--.

In column 22, at line 45, delete "alter", and insert --after--.

Signed and Sealed this

Twelfth Day of December, 2006

JON W. DUDAS
*Director of the United States Patent and Trademark Office*